US009297347B2

(12) United States Patent
Kokubun et al.

(10) Patent No.: US 9,297,347 B2
(45) Date of Patent: Mar. 29, 2016

(54) ENGINE STARTING APPARATUS

(71) Applicant: Hitachi Automotive Systems, Ltd., Hitachinaka-shi, Ibaraki (JP)

(72) Inventors: Shuichi Kokubun, Naka (JP); Shigehiko Omata, Mito (JP); Shigenori Nakazato, Mito (JP); Masato Saito, Hitachinaka (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 0 days.

(21) Appl. No.: 14/627,213

(22) Filed: Feb. 20, 2015

(65) Prior Publication Data

US 2015/0167618 A1 Jun. 18, 2015

Related U.S. Application Data

(63) Continuation of application No. 13/512,036, filed as application No. PCT/JP2010/063849 on Aug. 17, 2010, now Pat. No. 8,994,299.

(30) Foreign Application Priority Data

Dec. 3, 2009 (JP) ................................ 2009-275046

(51) Int. Cl.
*H02P 1/00* (2006.01)
*H02P 3/00* (2006.01)
(Continued)

(52) U.S. Cl.
CPC .......... *F02N 11/0862* (2013.01); *F02N 11/087* (2013.01); *F02N 11/0851* (2013.01);
(Continued)

(58) Field of Classification Search
CPC ........................ F02N 11/0862; F02N 11/0851
USPC ........................................................ 318/139
See application file for complete search history.

(56) References Cited

U.S. PATENT DOCUMENTS 6,486,625 B1 11/2002 Vilou
7,218,010 B2 * 5/2007 Albertson ........... F02N 11/0855 290/38 R (Continued)

FOREIGN PATENT DOCUMENTS

CN 1107799 C 5/2003
CN 1223758 C 10/2005

(Continued)

OTHER PUBLICATIONS

European Search Report issued in corresponding European Application No. 10834420.1 dated Sep. 22, 2015 (six pages).

(Continued)

*Primary Examiner* — Erick Glass
(74) *Attorney, Agent, or Firm* — Crowell & Moring LLP

(57) ABSTRACT

An engine starting apparatus is provided which can start an engine without inducing malfunctions of various electronic components. The engine starting apparatus comprises a pinion adapted to be brought into meshing engagement with a ring gear linked to an engine, a magnet switch supplied with current from a battery to move the pinion in the direction of the ring gear, a starter motor supplied with the current to rotate the pinion, a control unit for instructing the starter motor to start the engine, and a starter control unit for controlling, on the basis of the instruction, a first semiconductor switch subject to PWM control, wherein the starter motor and the magnet switch are stored in a first housing, the starter control unit is stored in a second housing, and the first housing is integral with the second housing.

6 Claims, 12 Drawing Sheets

(51) Int. Cl.

| | |
|---|---|
| ***H02P 5/00*** | (2006.01) |
| ***F02N 11/08*** | (2006.01) |
| ***F02N 15/00*** | (2006.01) |
| *F02N 15/06* | (2006.01) |

(52) U.S. Cl.

CPC .......... *F02N11/0855* (2013.01); *F02N 15/006* (2013.01); *F02N 15/067* (2013.01); *F02N 2011/0874* (2013.01); *F02N 2200/063* (2013.01); *F02N 2250/02* (2013.01); *F02N 2300/108* (2013.01)

(56) References Cited

U.S. PATENT DOCUMENTS

| | | | | |
|---|---|---|---|---|
| 7,275,509 | B2 | 10/2007 | Kassner | |
| 7,915,984 | B2 | 3/2011 | Niimi | |
| 8,036,815 | B2 * | 10/2011 | Okumoto | F02N 11/0844 123/179.28 |
| 8,069,832 | B2 * | 12/2011 | Okumoto | F02N 11/0844 123/179.25 |
| 8,079,340 | B2 * | 12/2011 | Okumoto | F02N 11/0855 123/179.25 |
| 2002/0047419 | A1 | 4/2002 | Shimizu et al. | |
| 2003/0070645 | A1 | 4/2003 | Osada et al. | |
| 2003/0214766 | A1 | 11/2003 | Hisamoto et al. | |
| 2003/0230271 | A1 | 12/2003 | Maruhashi et al. | |
| 2006/0181084 | A1 | 8/2006 | Albertson et al. | |
| 2007/0137602 | A1 | 6/2007 | Kassner | |
| 2008/0162007 | A1 | 7/2008 | Ishii et al. | |
| 2009/0206965 | A1 | 8/2009 | Niimi | |
| 2012/0275078 | A1 | 11/2012 | Kokubun et al. | |

FOREIGN PATENT DOCUMENTS

| | | | |
|---|---|---|---|
| CN | 1821569 | A | 8/2006 |
| DE | 102 45 820 | A1 | 4/2003 |
| DE | 103 47 683 | A1 | 5/2004 |
| EP | 1 378 661 | A1 | 1/2004 |
| EP | 2 080 897 | A2 | 7/2009 |
| JP | 2566105 | Y2 | 8/1993 |
| JP | 2002-31021 | A | 1/2002 |
| JP | 2002-115632 | A | 4/2002 |
| JP | 2004-11627 | A | 1/2004 |
| JP | 4082310 | B2 | 6/2004 |
| JP | 2004-308645 | A | 11/2004 |
| JP | 2007-107527 | A | 4/2007 |
| JP | 2008-16388 | A | 7/2008 |
| JP | 2009-185760 | A | 8/2009 |
| JP | 2009-224315 | A | 10/2009 |
| JP | 2011-117351 | A | 6/2011 |

OTHER PUBLICATIONS

International Search Report including English language translation dated Nov. 16, 2010 (Three (3) pages).

Japanese Office Action dated Dec. 3, 2013 with partial English translation (five (5) pages).

Chinese Office Action dated Jan. 6, 2014 with English translation (eighteen (18) pages).

Japanese Office Action with English translation thereof dated Dec. 3, 2013 {Five (5) pages}.

Chinese Office Action with English translation thereof dated Jan. 6, 2014 {Eighteen (18) pages}.

* cited by examiner

ENGINE STARTING APPARATUS

CROSS REFERENCE

This application is a continuation of U.S. application Ser. No. 13/512,036, filed May 25, 2012, which claims priority from Japanese Patent Application 2009-275046, filed on Dec. 3, 2009, the disclosures of which are expressly incorporated by reference herein.

TECHNICAL FIELD

The present invention relates to an engine starting apparatus of a vehicle.

BACKGROUND ART

The engine starting apparatus starts an engine by driving a starter motor with electric power supplied from a battery carried on a vehicle and by transmitting rotation of the starter motor to the engine by way of a transmission unit. Here, the value of an electric current passed to the starter motor has a direct influence upon the time to start the engine and therefore, needs to be several of hundreds of amperes in order for the engine to start within a predetermined time.

Since no counter electromotive force is generated by the rotation at the time to start the starter motor, a rush current flows from the battery to the starter motor and as a result, consumption of power of the battery increases steeply and the battery output voltage decreases temporarily. Consequently, at the time to start the engine, it sometimes happens that operation of a control unit constituted by electronic circuits becomes unstable or a microcomputer used for the control unit is reset.

Accordingly, as a method for starting the starter motor, a system has been proposed according to which a decrease in the battery output voltage during drive of the starter motor is suppressed by means of a controller carried on a vehicle and adapted to control the starter motor (see Patent Literature 1).

In Patent Literature 1, drive of the starter motor is controlled by means of the controller of an engine generator system and the starter motor and the controller are connected with each other through a harness. Then, the rush current is limited by PWM (Pulse Width Modulation)—controlling the consumptive power of starter motor, with the aid of a semiconductor switch connected in series between the starter motor and ground, in such a manner that, as the time elapses, the duty value increases from that immediately after starting, thereby suppressing the battery voltage from decreasing.

CITATION LIST

Patent Literature

Patent Literature 1: 2002-031021 Publication

SUMMARY OF INVENTION

Technical Problem

According to Patent Literature 1, in the control of the starter motor, a CPU, incorporated in the controller and adapted to calculate ignition timing of an igniter on the basis of engine temperatures and engine revolution angles, controls a semiconductor switch 45*a* (FET). Accordingly, with the aim of meeting the operation temperature of the CPU having an operation guarantee temperature lower than that of the FET, a controller 4 of the engine generator system including voltage reduction suppressing means is arranged at a position remote from the starter motor 8, so that the controller 4 and the starter motor 8 are connected with each other through a harness capable of meeting conduction of currents of several of hundreds of amperes.

More specifically, in the harness extending from the controller, input/output signals of the controller per se are bundled up and besides, bundled up together with input/output signals of the engine control unit and other electronic components on the way, so that noises due to electromagnetic induction from the harness associated with the starter motor have the influence upon electronic components. Then, it leads to a problem of inducing malfunctions of the control circuit for generator and igniter, the engine control unit and other electronic components.

To solve the above problem, use of low induction wiring such as a coaxial cable may be adopted but this requires an engine layout the low induction wiring into consideration, which in turn gives rise to a problem that the idling stop function cannot be added easily to the conventional engine.

Accordingly, an object of the present invention is to provide an engine starting apparatus which can start the engine without inducing malfunctions of various electronic components.

Solution to Problem

One of preferred embodiments of the present invention for solving the above problem is as below.

An engine starting apparatus comprises a pinion adapted to be brought into meshing engagement with a ring gear linked to an engine; a magnet switch supplied with an electric current from a battery to move the pinion in the direction of the ring gear; a starter motor supplied with the electric current to rotate the pinion; a control unit for instructing the starter motor to start the engine; and a starter control unit for controlling, on the basis of the instruction, a first semiconductor switch subject to PWM control, wherein the starter motor and the magnet switch are stored in a first housing, the starter control unit is stored in a second housing, and the first housing and the second housing are integrated with each other. Namely, the starter control unit not affected by integration with the starter motor is integrated with it but a control unit caused to suffer from a thermal influence through the integration is arranged remotely.

Advantageous Effects of Invention

According to this invention, an engine starting apparatus can be provided which can start an engine without inducing malfunctions of various electronic components.

Other objects, features and advantages of the present invention will become apparent from a description of embodiments of the invention taken in conjunction with the accompanying drawings.

DESCRIPTION OF EMBODIMENTS

Embodiments will now be described by making reference to the drawings.

Embodiment 1

Figure 1:
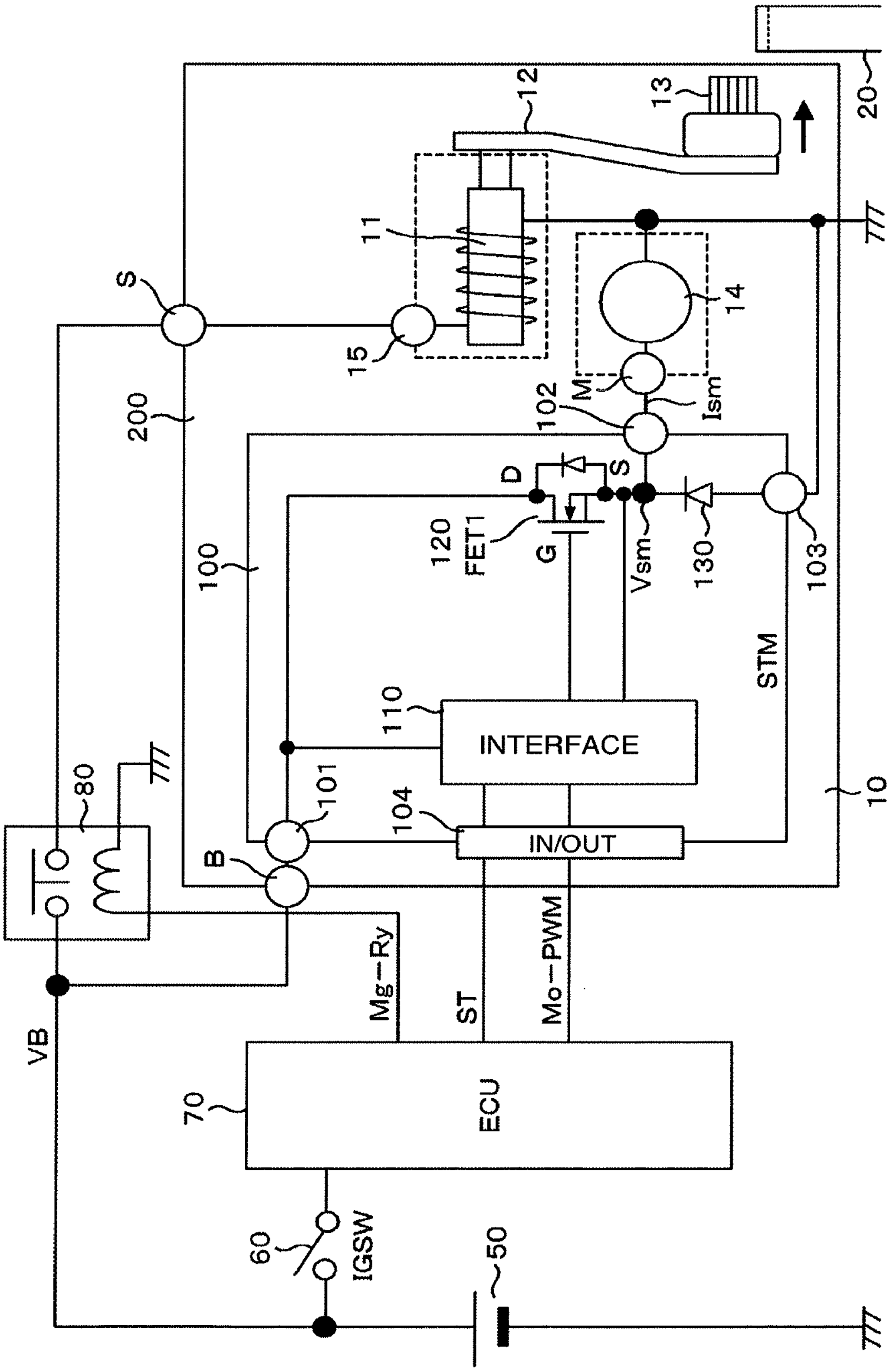
FIG. 1 is a circuit diagram of an engine starting apparatus.
Figure 2:
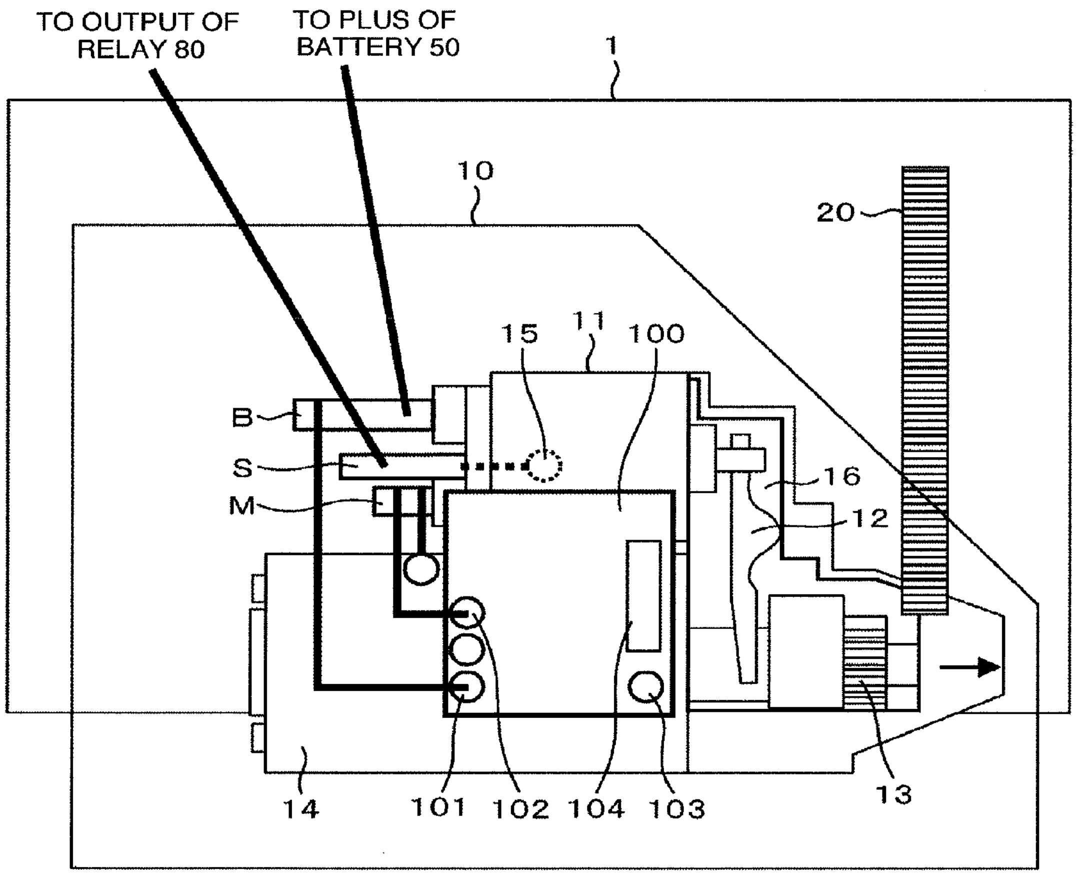
FIG. 2 is a diagram illustrative of a structure of the engine starting apparatus.
Figure 3:
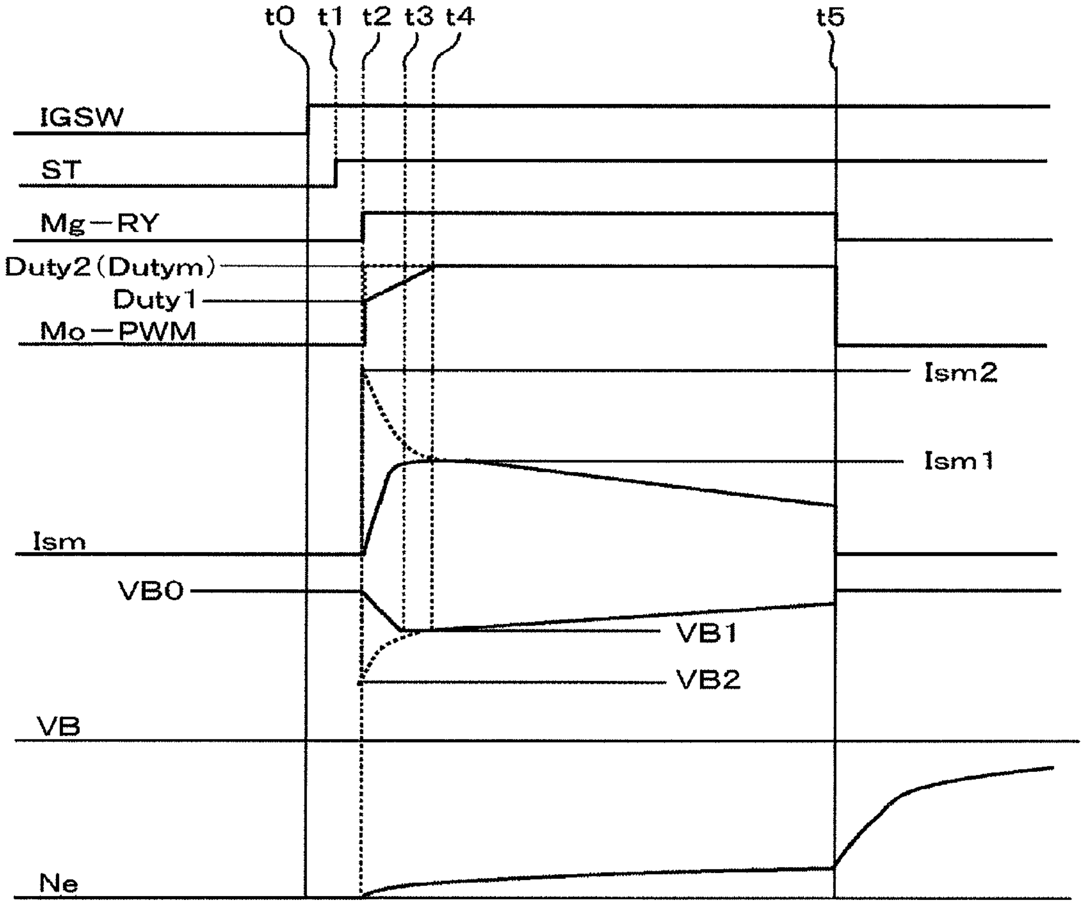
FIG. 3 is an operation diagram of the engine starting apparatus.

FIG. 1 is a circuit diagram of an engine starting apparatus 10, FIG. 2 is a diagram illustrative of the structure of engine starting apparatus 10 and FIG. 3 is a diagram of operation in FIG. 1.

In the engine starting apparatus 10 of FIG. 1, a shift mechanism 12 can be moved by attraction force based on operation of a magnet switch 11 to move a pinion 13 in arrow direction so as to cause it to mesh with a ring gear 20 linked to an engine. Then, on the way of meshing engagement or after establishment of a meshed state, a starter motor 14 is operated so that the rotation of starter motor 14 may be transmitted to the ring gear 20 by way of the pinion 13 and the crankshaft of engine 1 can be rotated to control fuel and ignition, thus starting the engine.

The starter motor 14 is controlled by a starter control unit (hereinafter, STM) 100 having input/output terminals 101, 102, 103 and 104. The magnet switch 11 has an input terminal represented by terminal 15.

A battery 50 carried on the vehicle is connected with a control unit (engine control unit: hereinafter, ECU) 70 via an ignition switch (hereinafter, IGSW) 60.

The ECU 70 executes judgment of start/stop of the engine, ignition control and fuel injection control, the input signal is represented by an engine rotation signal and air flow rate signal and the like, and the output signal is represented by a start signal (hereinafter, ST) and a PWM signal for drive of starter motor 14 (hereinafter, Mo-PWM) which are fed through the terminal 104 of STM 100 and besides, through a Mg-Ry via a relay 80 and an injector injection signal and ignition signal which are not shown. The ECU 70 is composed of a microcomputer, an input/output interface circuit and a constant-voltage generation circuit acting as a power supply for them which are not shown.

Further, the battery 50 is connected with the relay 80 having its output connected to a terminal 15 to turn on/off the current to the magnet switch 11 and being on/off controlled by the Mg-Ry.

The STM 100 is a control module for the starter motor 14 and has the terminal 101 to which a battery voltage VB is inputted and an interface circuit 110 being inputted with the St and $M_0$-PWM from the ECU 70. The $M_0$-PWM is raised in voltage by means of a not shown charge pump to deliver a signal to a gate terminal G of a semiconductor switch 120 for conduction of a current to the starter motor 14 (hereinafter, FET 1).

The FET 1 has a drain terminal D connected to the battery 50 via the terminal 101 and a terminal S connected to the cathode of a flywheel diode 130 which in turn connects to the starter motor 14 via the terminal 102.

The anode of free-wheel diode 130 is connected to the ground of starter motor 14 via the terminal 103.

The engine starting apparatus 10 of FIG. 1 is structured as diagrammatically shown in FIG. 2 to have an integral structure of magnet switch 11, starter motor 14 and STM 100 and is arranged at a position for enabling the pinion 13 to be brought into meshing engagement with the ring gear 20 of engine 1.

In FIG. 2, the structure is illustrated as partly opened to show an open region 16 for clarifying an internal structure where the shift mechanism 12 and pinion 13 are located.

More specifically, in the open region 16, a housing of the magnet switch 11 is in communication to a housing of the starter motor 14 through a gap where the shift mechanism 12 is arranged, so that the magnet switch 11 is integral with the starter motor 14 in an integral housing.

The STM 100 is of a housing which internally stores parts and wiring substrates shown in FIG. 1 and which is integral with the housing in which the magnet switch 11 and the starter switch 14 are integrated with each other.

The box-like housing has terminals for external wiring represented by the terminal 101 for battery 50, the terminal 102 for starter motor 14 and the terminal 103 for ECU 70 and the respective terminals are connected in accordance with the wiring shown in FIG. 1.

On the other hand, the integral structure of magnet switch 11 and starter motor 14 has terminals B, M and S and wiring is set up as shown at thick line including connection from battery 50 to terminal B through a harness, connection from terminal B to terminal 101 of STM 100 through a bus bar, connection of the harness extracted from the starter motor 14 to terminal M, connection from the terminal M to terminal 102 of STM 100 through a bus bar, connection of the output of relay 80 to the terminal S through a harness and connection of the terminal S to terminal 15 inside the magnet switch 11.

Specifically, the housing storing the STM 100 (second housing) is so arranged as to hang over the housing for integrated magnet switch 11 and starter motor 14 (first housing) and the first and second housings are connected to each other by way of a bus bar. The first housing has the terminal M for connection of starter motor and STM 100 and the terminal B for connection of battery and STM 100. The bus bar is connected vertically to the second housing, the first and second terminals are so arranged as to protrude from the first housing, and the bus bars are so connected as to sandwich the terminals M and B.

Figure 12:
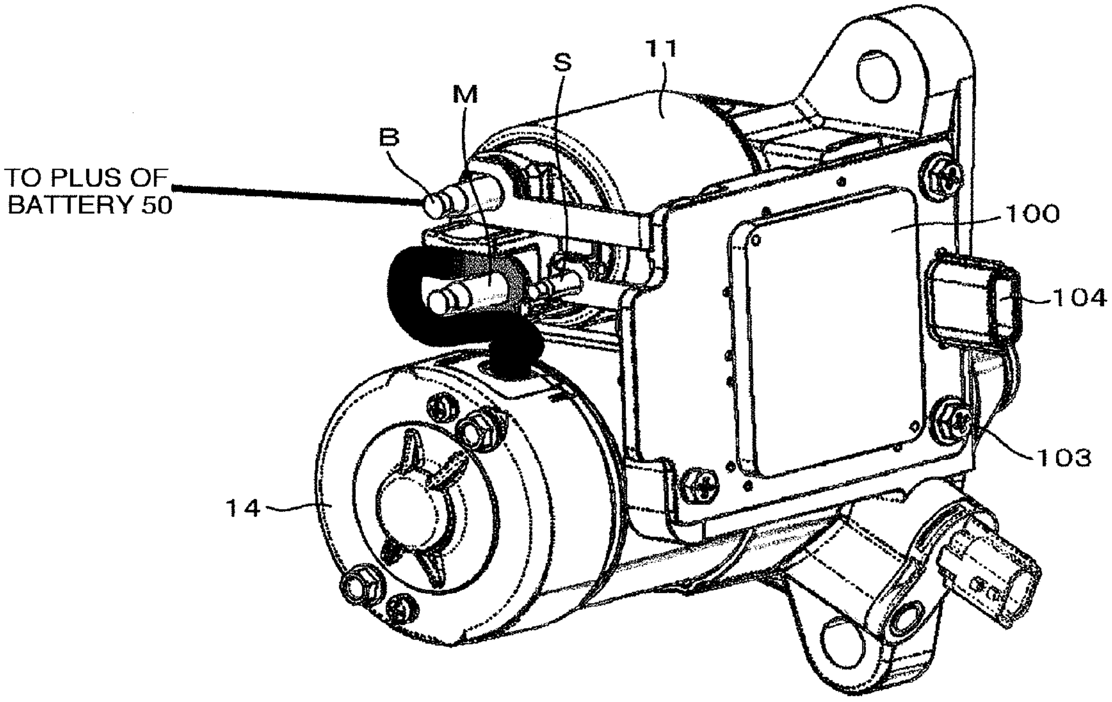
FIG. 12 is an overall diagram of the engine starting apparatus.

FIG. 12 diagrammatically illustrates the whole of engine starting apparatus. As shown in FIG. 12, the first housing storing the magnet switch 11 and starter motor 14 is made integral with the second housing storing the STM 100.

In the structure of FIGS. 1 and 2, operation at the time of engine starting will be described with reference to FIG. 3 by was of an example where the driver operates the IGSW 60.

When the IGSW 60 is turned on at time t0, the ECU 70 delivers an output signal ST at time t1 that the initialization has ended to start the interface circuit 110, thus starting operation of the STM 100.

At time t2 that initialization of engine start has ended, the ECU 70 outputs a Mg-Ry to turn on the relay 80 so that the pinion 13 may be moved in arrow direction to mesh with the ring gear 20. Then, a Mo-PWM is outputted to start revolving operation of starter motor 14.

It is to be noted that time points t1 and t2 are times depending on engine starting control by the ECU 70 and durations t0~t1 and t1~t2 are not always those as shown in FIG. 3 necessarily and time points t0, t1 and t2 may be identical.

Conduction rate Duty of the Mo-PWM outputted from the ECU 70 is Duty 1 at time point t2 and it increases at time point t4 to Duty 2 which is larger than the Duty 1.

A current Ism of starter motor 14 begins to flow at time t2 and after time t2, it flows depending on a difference voltage (Vsm−Esm) between an induced voltage Esm generated by rotation of starter motor 4 and an output voltage Vsm of STM 100 (drain D terminal voltage of FET1), that is, a PWM-controlled output voltage (Vsm=VB×Duty).

Since the current Ism is supplied from the battery 50, a voltage drop is generated by an internal resistance of battery 50 and the battery voltage VB decreases from its initial voltage VB0 in accordance with the current Ism.

To add, in the course of increasing the Duty from Duty 1 at time t2 to Duty 2 at time t4, a status occurs between time points t3 and t4 in which the current Ism and the VB take substantially constant values Ism and VB1, respectively, indicating a balanced status in which a current value obtained by dividing the difference voltage (Vsm−Esm) between output voltage Vsm and induced voltage Esm by the internal resistance becomes constant. The balanced status is exemplified as above but it differs depending on the battery 50, starter motor 14 and Duty.

Further, the Duty 2 is of a duty in a status that the starter motor 14 has already been rotating and excepting necessary for limitation on the current Ism, it may be a maximum conduction rate Dutym (=100%).

After t4, M0-PWM becomes constant equaling Duty 2 and because the induced voltage Esm in starter motor 14 increases as the revolution speed increases, the current Ism decreases and the VB increases.

When the current Ism begins to flow at time t2 and as the starter motor 14 rotates to cause the ring gear 20 meshed with the pinion 13 to rotate, an engine revolution speed Ne increases and the engine begins to start at time t5.

Engine starting is detected by the ECU 70 and when the ST and Mo-PWM are turned off at time t5, the current Ism of starter motor 14 is turned off and operation of STM 100 ends.

Incidentally, if the starter motor 14 is operated at time t2 by changing the Duty to Dutym as shown at dotted line, the battery voltage VB is directly applied to the starter motor 14, so that a current Ism2 resulting from division of the battery voltage VB by the internal resistance of starter motor 14 is caused to flow until the induced voltage Esm is generated as the starter motor 14 rotates and in the case of the internal resistance being several of tens mΩ, a rush current in excess of 1000 A results.

With such a rush current Ism2 caused to flow out of the battery 50, a voltage drop to VB2 lower than VB1 takes place as shown at dotted line of VB in FIG. 3.

The ECU 70 and other control unit and navigation unit connected to the power supply represented by the battery 50 are set with the minimum guarantee voltage VBs of battery voltage VB which prevents these units from being initialized (reset) but a voltage reduction to below VBs fails to guarantee operations of the various units.

Figure 4:
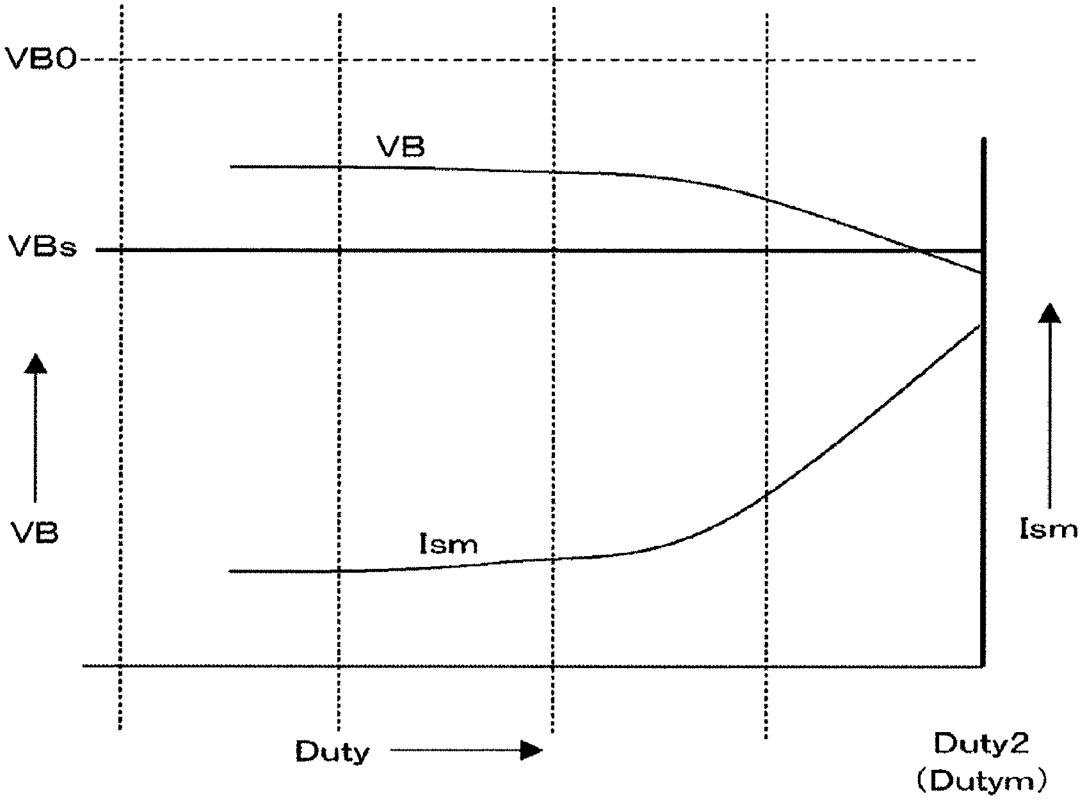
FIG. 4 is an operation diagram of the engine starting apparatus.

Illustrated in FIG. 4 is an example where with the time interval from time t2 to time t4 set to a constant and with Duty 2=Dutym (100%) set, the current Ism of starter motor 14 and the battery voltage VB are measured by changing the Duty.

It will be seen from the example as above that the Duty 1 shown on Mo-PWM in FIG. 3 may be set to a value smaller than Duty 2 (100%) with a view to suppressing the decrease in VB to above the minimum guarantee voltage VBs.

Incidentally, during times t2 to t5 in FIG. 3, the faster the rise in rotation of starter motor 14, the shorter the engine starting time becomes, proving good engine starting performance.

Under the condition that the smaller the Duty 1, the smaller the output voltage Vsm (VB×Duty 1) of FET1 becomes, the rotation speed of starter motor 14 is lowered and besides, under the condition that the longer the time covering times t2 to t4 becomes, the more the rotation speed of starter motor 14 rises slowly, the engine starting time is prolonged.

In other words, it is necessary for the Duty 1 and the time covering times t2 to t4 to be so set as to suppress the reduction in VB to above the permissible value and to make the engine starting time below the permissible value.

In one of inspection examples conducted by the present inventors, it has been proven that when Duty 2=100% is set and with Duty 1=70% or less or the time covering times t2 to t4=100 ms or less set, the engine starting time can be less than 400 ms and the battery voltage can be kept to above 8V.

As described above, through the PWM control for limiting the Duty to Duty 1 at the time of starting the starter motor 14, the rush current can be smaller than Ism 2 for Duty=Duty 2 (Dutym) but even when starting is effected at the Duty 1 set in relation to the engine starting time, the rush current I sm1 will amount up to several of hundreds of amperes.

When a current of several of hundreds of amperes is caused to flow under the PWM control, such factors as on/off of current by switching of the FET 1 and a recovery current generated during on-state of FET 1 at the time of conduction of the flywheel diode 130 (equivalent to short-circuit current of battery voltage VB) are responsible for generating induction noises from wiring between the terminals 102 and M and accordingly, when the wiring between the terminals 102 and M is long and is bundled up with coexistent wiring for ECU 70 and other control unit, there arises conceivably a problem that malfunctions of these units will be induced and a voltage drop in the wiring is too large to maintain the minimum guarantee voltage VBs shown in FIG. 4.

But, since the STM 100 and the starter motor 14 are arranged integrally with each other, the wiring between the terminals 102 and M will not be bundled up with the wiring for the ECU 70 and other control units, thus bringing about such an advantageous effect that malfunctions of these units will not be induced.

Especially, by separating the ECU 70 for generating and transmitting the Mo-PWM from the STM 100 for performing control by using the semiconductor switch, the ECU 70 having the operation guarantee temperature lower than that of the semiconductor switch will not be affected by heat generation by the semiconductor switch. In other words, components not affected by the integration with the starter motor 14 are integrated therewith and only components affected by the integration are arranged separately to thereby solve not only the problem of heat generation but also the problem of an increase in harness.

Also, in the operation of starter motor 14 in engine starting control, by PWM-controlling the FET 1 from the predetermined Duty during initial period of driving, the current Ism of starter motor 14 can be limited, with the result that the battery voltage VB can be suppressed from decreasing and voltages of the individual control units settled to be above the minimum guarantee voltage VBs of battery voltage VB can be maintained.

Further, since the Duty is changed continuously from Duty 1 to Duty 2, the output voltage Vsm and current Ism of FET 1 for driving the starter motor 14 can be changed continuously, thus bringing about such an advantageous effect that the starter motor 14 can be devoid of variations in rotation and torque and smooth engine starting can be attained.

Furthermore, not only voltage drop in the wiring can be decreased but also the reduction in battery voltage can be decreased and consequently, it is possible to make full use of the output characteristics of starter motor, also bringing about an advantageous effect of improving the engine starting characteristics.

Moreover, in operation of the starter motor 14 participating in engine starting control, by controlling the PWM of FET 1 from a predetermined Duty during initial period of drive, such advantageous effects can be attained that the rush current of starter motor 14 can be limited and consumption of excessively large current of battery can be suppressed to suppress the battery from being deteriorated.

Embodiment 2

FIGS. 5A and 5B and FIGS. 6A and 6B illustrate embodiments of different schemes of control by the STM 100, designating components identical to those in FIG. 1 and signals identical to those in FIG. 1 by the same reference signs.

Since in embodiment 1 the Mo-PWM is changed from Duty 1 to Duty 2 (Dutym) through the time covering times t 2 to t 4, the current Ism of starter motor 14 is controlled in Mo-PWM fashion and besides, affected by the battery voltage VB.

Thus, in view of the fact that the battery voltage VB differs depending on the charge/discharge status and deteriorated status of battery and when the battery is placed in insufficiently charged condition, the battery voltage VB becomes low to approximate the minimum guarantee voltage VBs, there will occur causes of failing to maintain the minimum guarantee voltage VBs by conducting current to the starter motor 14 and also of becoming short of the current Ism responsible for delay in engine starting time.

Then, in FIG. 5B, feedback control is carried out by using the minimum guarantee voltage VBs as a voltage command value VBsp in order to prevent the battery voltage VB from decreasing to below the command value and in FIG. 6, by setting a current command value I smp in order to prevent the current Ism from decreasing to below the current command value.

Firstly, in FIG. 5, by using as a compensation element a voltage deviation between the battery voltage VB and a voltage command value VBsp larger than the minimum guarantee voltage VBs, a battery voltage control circuit 200 causes a PWM converter 201 to output a Mo-PWM, thereby controlling the Duty of the FET 1.

Figure 5A:
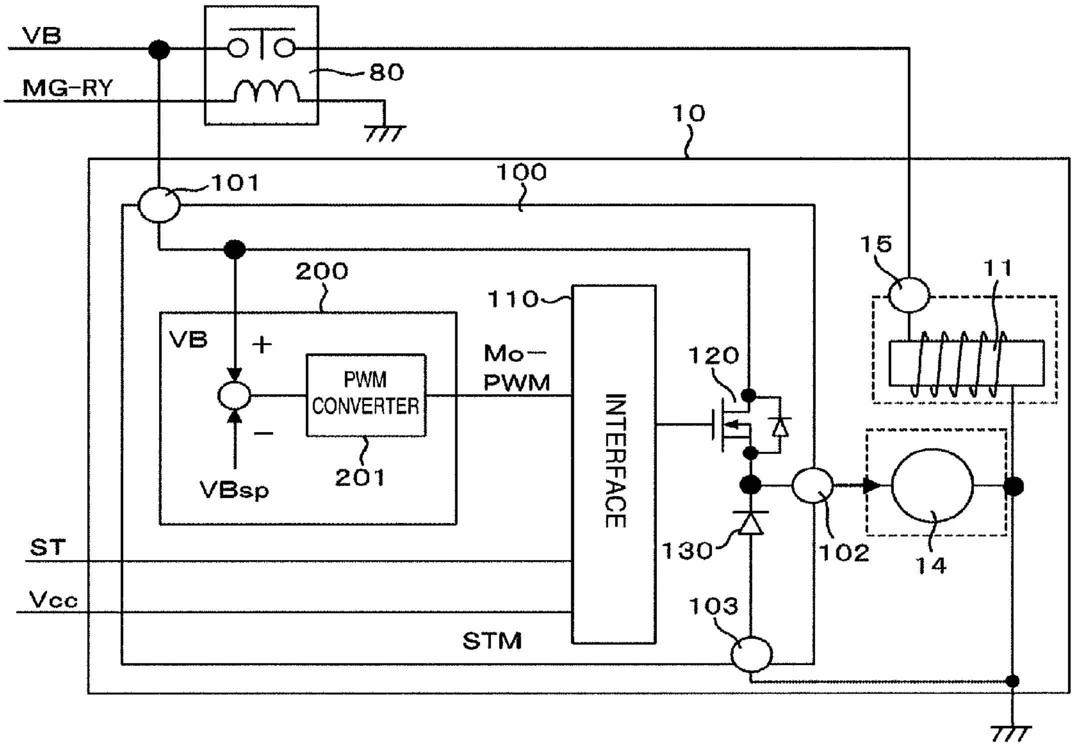
FIG. 5A is a circuit diagram of an engine starting apparatus.
Figure 5B:
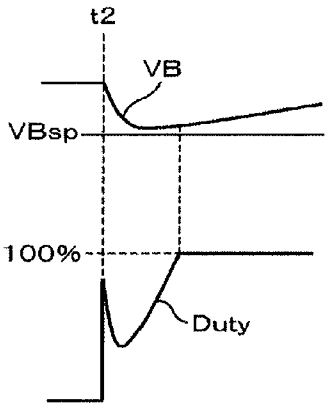
FIG. 5B is a waveform diagram for FIG. 5A.

When the starter motor 14 is operated at time t 2 in FIG. 5B, the voltage deviation between VB and VBsp is large and the Duty grows and as the current Ism increases, the VB decreases to reduce the voltage deviation so as to change the Duty in reducing direction.

As the VB decreases to the VBsp, the Duty grows to set up substantially VB=VBsp and after the Duty reaches 100%, the voltage control is prevented from proceeding.

Figure 6A:
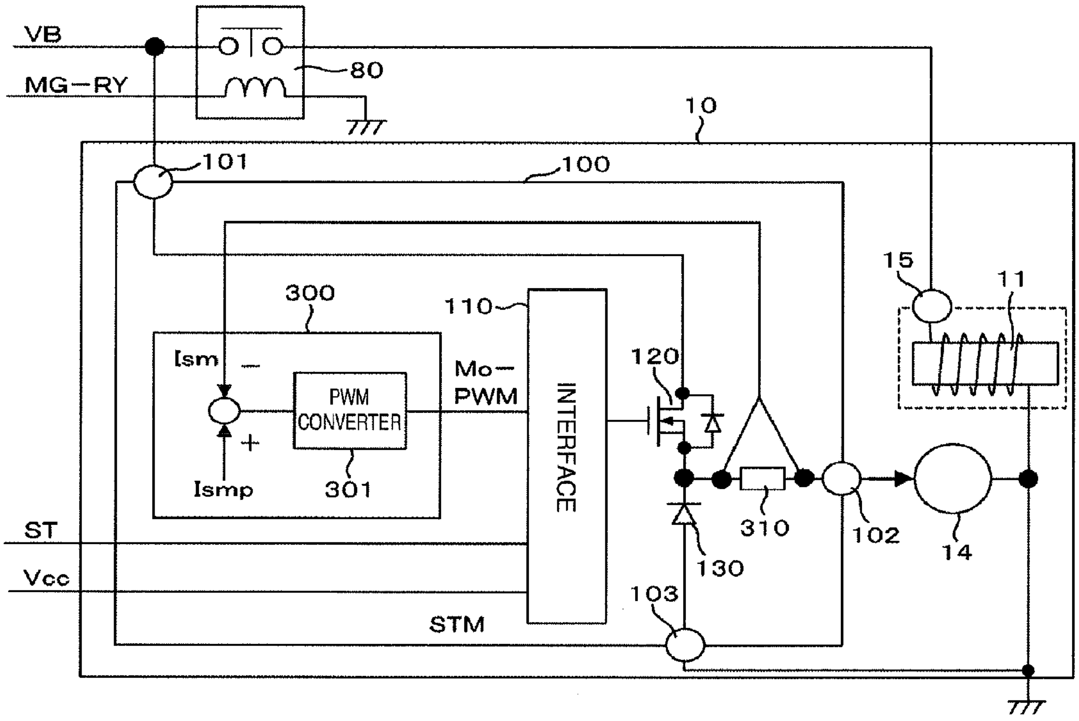
FIG. 6A is a circuit diagram of an engine starting apparatus.

Next, in FIG. 6A, a starter motor current control circuit 300 detects the current Ism of starter motor 14 with the help of a current sensor 310 and a compensation element, a current deviation between the current command value I smp and the current I sm to cause a PWM converter 301 to output Mo-PWM so as to control the Duty of the FET 1.

Here, the current command value I smp is a value which prevents the battery voltage VB from decreasing below the minimum guarantee voltage VBs and the current command value I smp can be variable according to the battery voltage VB.

Figure 6B:
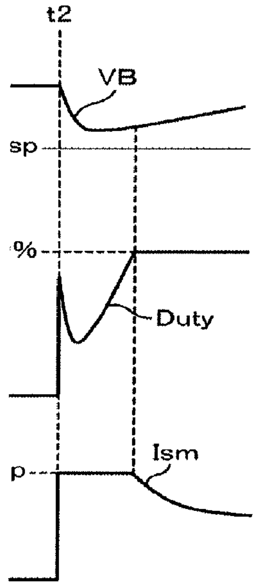
FIG. 6B is a waveform diagram for FIG. 6A.

When the starter motor 14 is operated at time t 2 in FIG. 6B, the current deviation between I smp and I sm is large and therefore, the Duty grows toward 100% and as the current Ism reaches I smp, the Duty changes in reducing direction.

Then, the Duty grows to make the current I sm substantially equal to I smp and after the Duty reaches 100%, the current control is prevented from proceeding.

Advantageously, the battery voltage VB during the initial drive period of starter motor 14 can be suppressed from decreasing and at the same time, even for different electrical specifications of the battery voltage VB and the starter motor 14, the advantageous effect of suppressing the battery voltage VB from decreasing can be maintained.

It will be appreciated that even when each of the battery voltage control circuit 200 in FIG. 5A and the starter motor current control circuit 300 in FIG. 6A is included in either the STM 100 or ECU 70 shown in FIG. 1, the operation and the advantageous effects remain equivalent.

Embodiment 3

Figure 7:
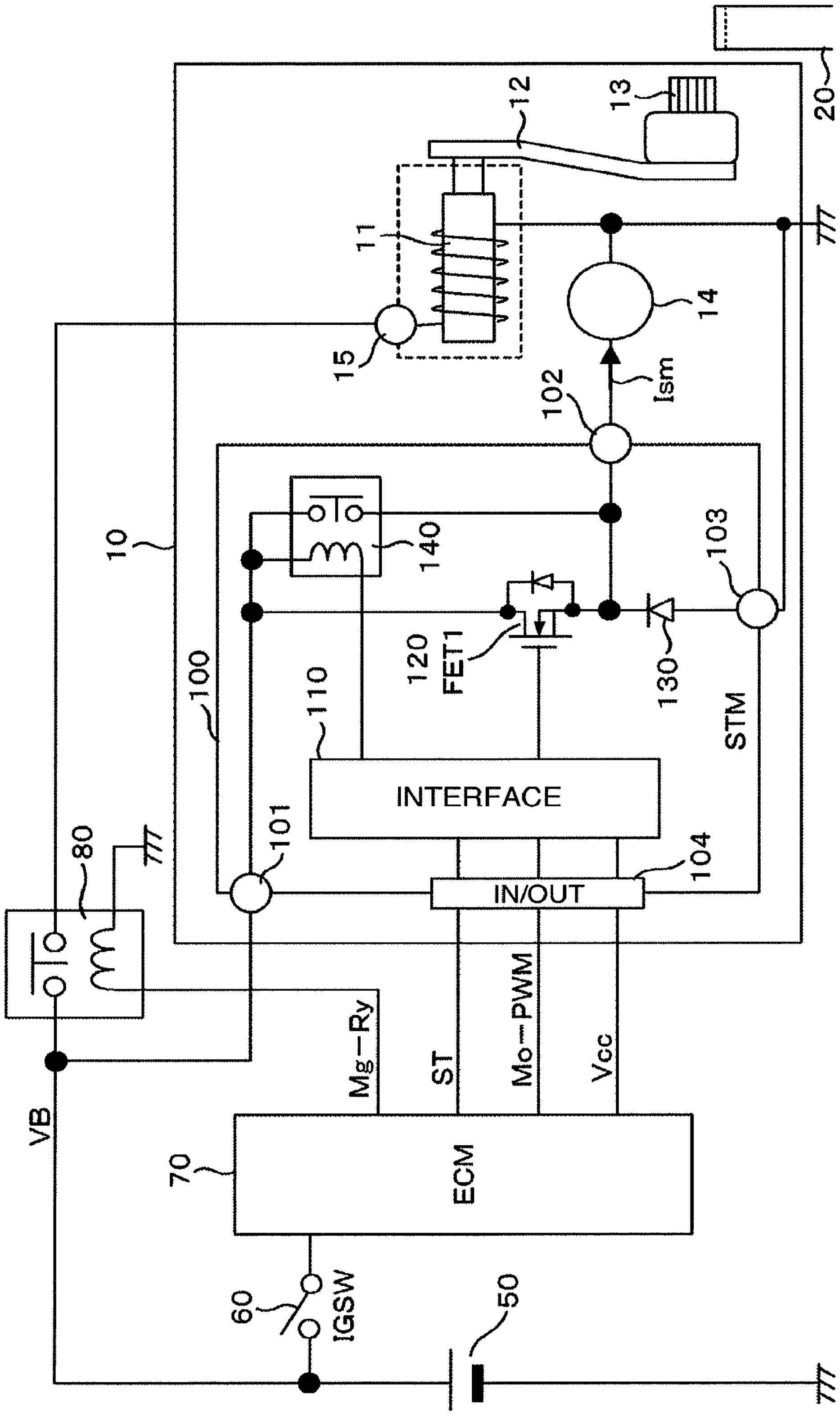
FIG. 7 is a circuit diagram of an engine starting apparatus.
Figure 8:
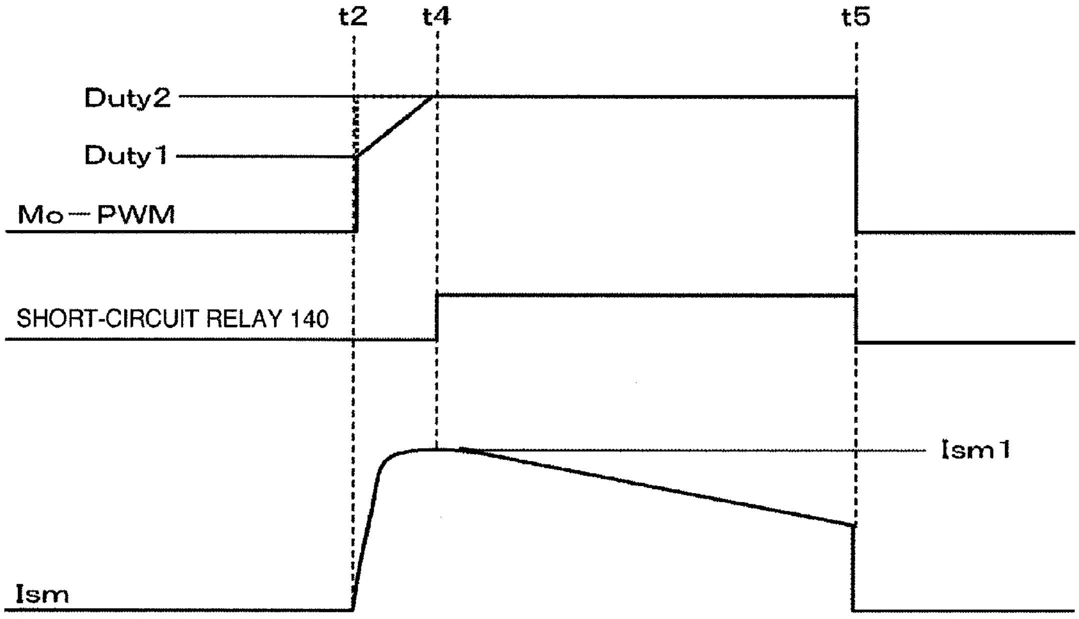
FIG. 8 is an operation diagram of the engine starting apparatus.

FIG. 7 is a wiring diagram of an engine starting apparatus showing another embodiment and FIG. 8 is a diagram of operation in FIG. 7, designating components identical to those in FIGS. 1 and 3 by the same reference signs.

In embodiment 1, under the condition that the FET 1 is turned on at 100% of Duty, current conduction proceeds until time t5 at which the engine start initiates but with the FET 1 turned on, heat is generated by power consumption attributable to a resistance during turn-on. With the FET 1 placed in on-status condition (current conduction), power loss is generated by a resistance component (on resistance) while the FET 1 being turned on and therefore, a measure for heat radiation or cooling is necessary to prevent the FET 1 from exceeding the permissible junction temperature.

By using as the FET 1 an FET having an on-resistance of a very small resistance value of about 2 m Ω, the heat generation can be reduced to minimal value but since the power loss of FET 1 is proportional to square of current I sm, the current I sm has a larger influence upon the heat generation.

Accordingly, by merely using the FET of a very small on-resistance, the heat generation cannot be suppressed sufficiently.

Then, in embodiment 2, a measure for heat radiation is practiced by connecting a short-circuit relay 140 in parallel with the FET 1.

More particularly, as shown in FIG. 8, the FET 1 is operated in the PWM fashion until the Duty of Mo-PWM at time t2 at which the starter motor 4 is started ranges from Duty 1 to Duty 2 (Dutym=100%) but at time t4 at which the Duty 2 is reached, the short-circuit relay 140 is turned on.

On-state of the FET 1 proceeds during only a time duration of time t2 to time t 4 and hence, the heat value can be reduced to a great extent and the measure for heat radiation can be facilitated to advantage.

Embodiment 4

Figure 9:
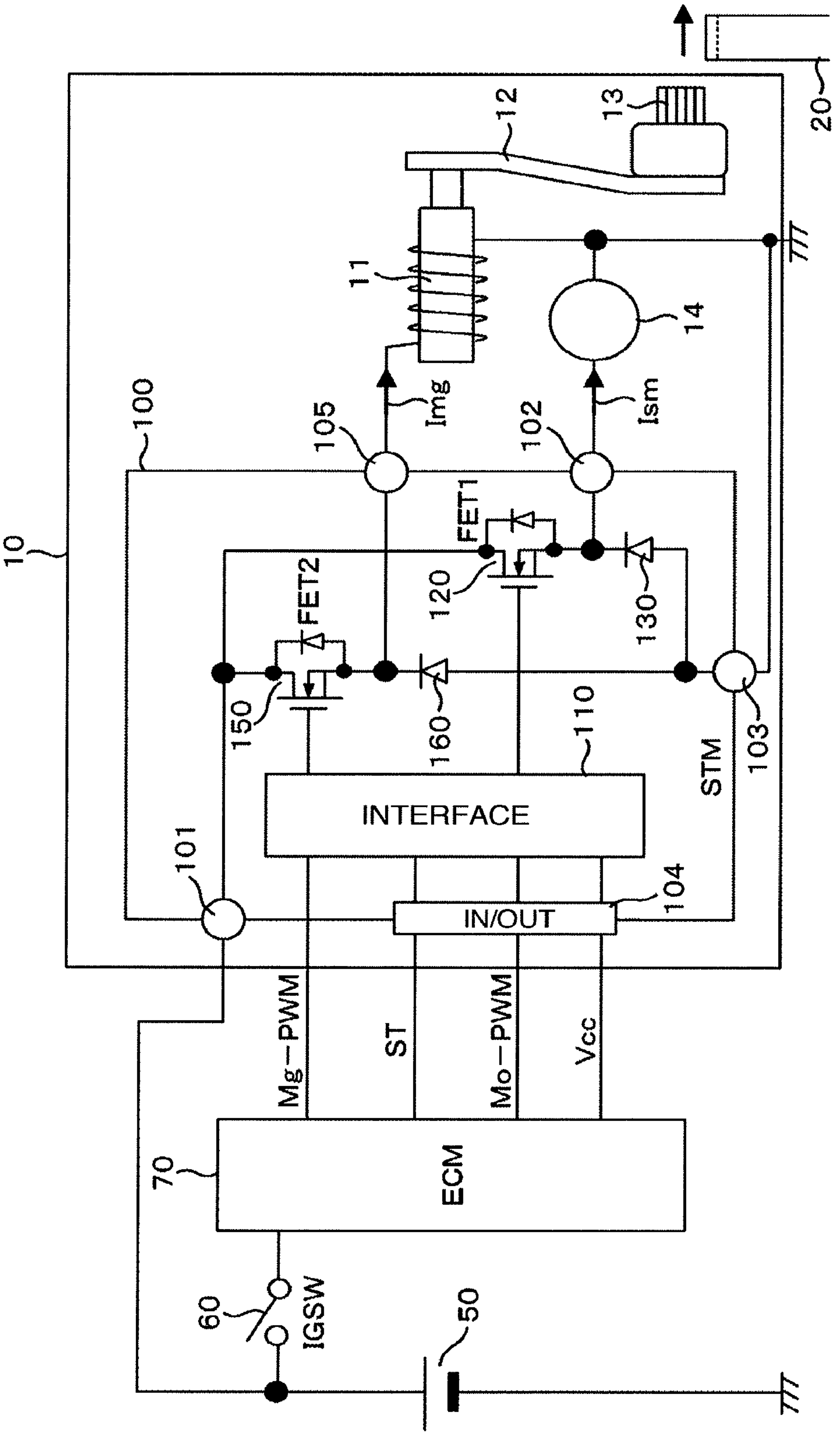
FIG. 9 is a circuit diagram of an engine starting apparatus.
Figure 10:
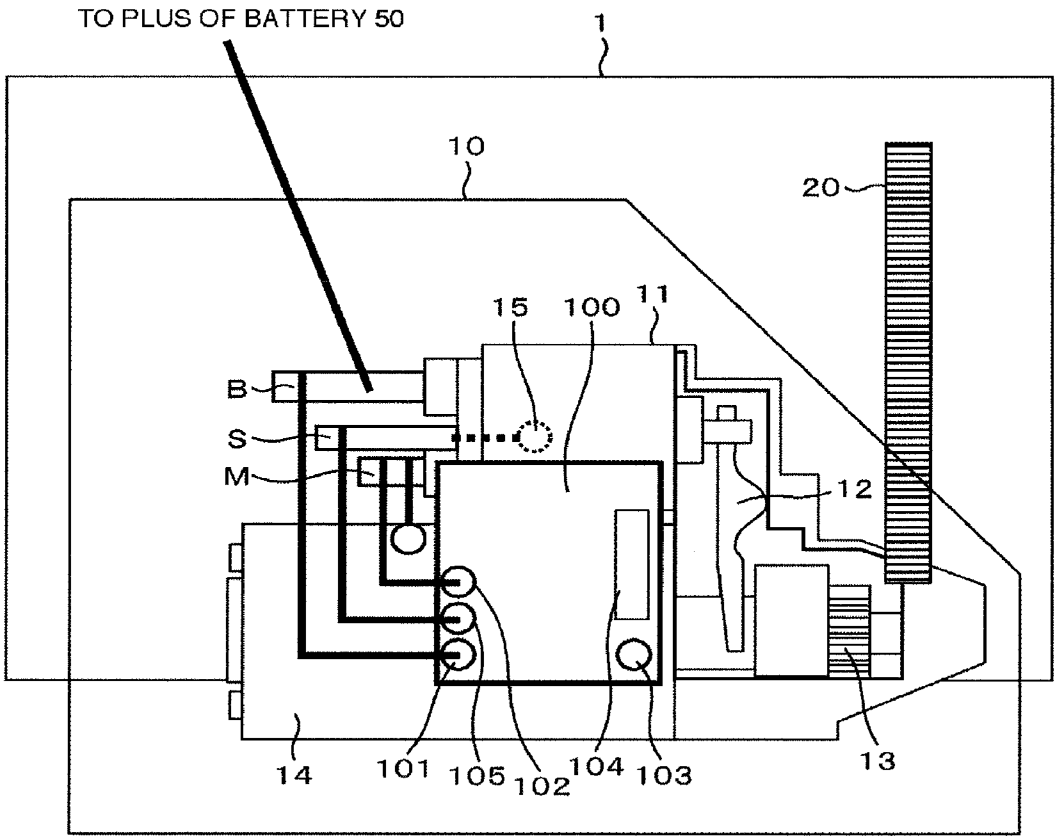
FIG. 10 is a diagram illustrative of a structure of the engine starting apparatus.
Figure 11:
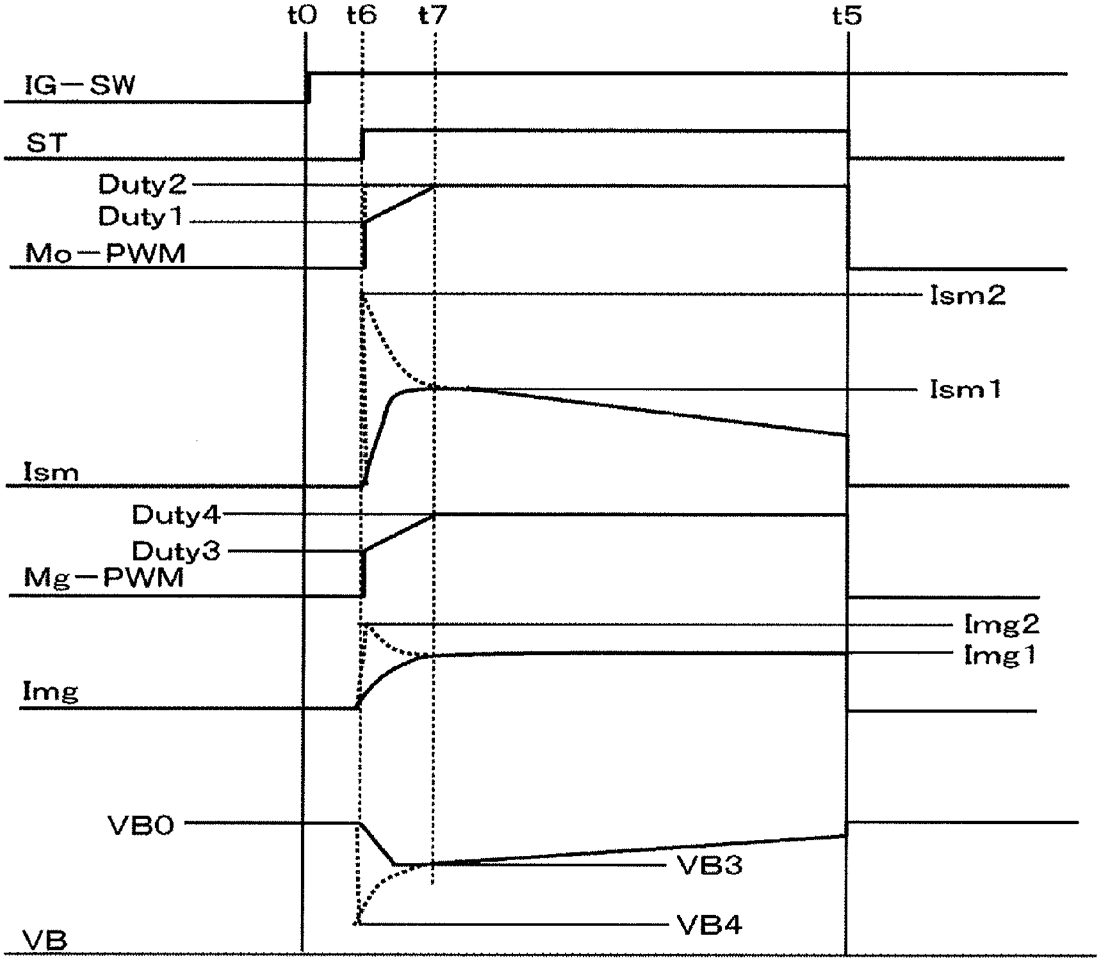
FIG. 11 is an operation diagram of the engine starting apparatus.

FIG. 9 is a circuit diagram showing an engine starting apparatus 10 according to still another embodiment, FIG. 10 is a diagram illustrative of a structure of the engine starting apparatus 10 and FIG. 11 is a diagram of operation in FIG. 9, designating components identical to those in FIGS. 1, 2 and 3 by the same reference signs.

In the circuit construction shown in FIG. 1, the output signal Mg-Ry is outputted at time t1 to turn on the relay 80 so as to conduct current flow to the magnet switch 11, so that the pinion 13 may be moved by attractive force in arrow direction to mesh with the ring gear 20.

In operation at that time, the current Img flowing to the magnet switch 11 is limited by the resistance of coil for actuating the magnet switch 11 but when cooling engine, the coil resistance is small and so, a large rush current flows and as the temperature of coil increases by the current flow, the coil resistance increases to decrease the current.

Accordingly, in embodiment 4, the current Img flowing during the initial operation period for small coil resistance is limited and the advantageous effect of suppressing the battery voltage VB from decreasing can be attained.

In the STM 100 in FIG. 9, the control circuit for starter motor 14 has the same circuit structure as that in FIG. 1 but in the control circuit for magnet switch 11, a semiconductor switch 150 (hereinafter, termed FET 2) is connected, having a drain terminal D connected to the battery 50, a terminal S connected to the coil 11 and flywheel diode 160 connecting in turn to terminal 104.

A PWM signal for driving the magnet switch 11 (hereinafter, Mg-PWM) is outputted from the ECU 70 to the FET 2 as in the case of the Mo-PWM.

In the engine starting apparatus 10 shown in FIG. 10, the STM 100 has a box-like housing in which the magnetic switch 11 and starter motor 14 are integrally structured and stored fixedly, as in the case of FIG. 2 and parts and wiring substrates shown in FIG. 9 are located internally of the housing.

The STM 100 differs from that in FIG. 2 in that a terminal 105 is provided which is connected to the terminal S through a bus bar, eliminating the connection to the relay but other terminal connections are the same as those in FIG. 2. Namely, the first housing has the terminal S for connection of STM 100 to the magnet switch.

In FIG. 11, operation of the STM 100 is started by turning on IGSW 60 at time t0 and by outputting the start signal ST and Mo-PWM and Mg-PWM at time t6.

Illustrated in FIG. 11 is an example where the starter motor 14 and magnet switch 11 are started for operating simultaneously at time t6. Operation of the starter motor 14 is the same as that in embodiment 1 and will not be described herein.

The Duty of Mg-PWM outputted from the ECU 70 at time t6 is Duty 3 for starting flow of the current Img to the magnet switch 11 and the Duty is changed to Duty 4 at time t7 so as to continue the flow of current Img at the maximum Duty m.

In contrast to the drive of starter motor 14, the induced voltage Esm is absent for the current Img and where the resistance of coil 11 is Rmg, the output voltage Vmg of FET 2 is indicated by Vmg (=VB×Duty)/Rmg which increases in proportion to the value of Duty.

However, by passing the current Img through the coil 11, the temperature rises and the resistance Rmg grows and so, the proportionate relation cannot always be held.

When it is presumed that the temperature of coil 11 becomes substantially constant after time t7, the current Img will take a constant value of Img1 at the time that Mg-PWM takes a constant Duty 4.

When the engine start initiates at time t5, the ST, Mo-PWM and Mg-PWM are turned off and the operation of STM ends.

As described above, through the PWM control for limiting the Duty to Duty 3 at the time of starting the magnet switch 11, the rush current can be smaller than Img 2 for Duty=Duty 4 (Dutym) but even when starting is effected at the Duty 3 set in relation to the engine starting time, the rush current will amount up to several of tens of amperes.

Consequently, like the phenomenon during starting of the starter motor 14, induction noises attributable to the PWM control are generated and if the wiring between the terminals 105 and S is long and is bundled up with coexistent wiring for ECU 70 and other control units, there arises conceivably a problem that malfunctions of these units will be induced and a voltage drop in the wiring is too large to maintain the minimum guarantee voltage VBs shown in FIG. 4.

But, in the embodiment shown in FIG. 10, the STM 100 and the starter motor 14 are arranged integrally with each other and therefore, the bus bar wired between the terminals 105 and S will not be bundled up with the wiring for the ECU 70 and other control units, thus attaining such an advantageous effect that malfunctions of these units will not be induced.

Further, in the case that the maximum Duty m develops at time t6, the current Img is large by taking Img 2 in comparison with Img 1 and as shown at dotted line and the battery voltage VB decreases largely but the Duty 3 is smaller than Duty m and the current is limited, bringing about such an advantageous effect that the battery voltage VB can be suppressed from decreasing.

Illustrated in FIG. 11 is an example where the starter motor 14 and magnet switch 11 start operating concurrently at time t 6 and the currents I sm and I mg begin to flow simultaneously, causing the battery voltage VB to decrease largely.

Then, by causing the currents I sm and I mg to start flowing with a time difference, the battery voltage VB can advantageously be suppressed from decreasing.

To add, before engine starting, the ring gear 40 is placed in stop condition and the pinion 13 is conditioned not to mesh and hence, the starter motor 14 is placed in unloaded condition.

With the current I sm caused to flow at time t6 in FIG. 11, the starter motor 14 rotates rapidly and thereafter, when the current I mg for magnet switch 11 is caused to flow and the pinion 13 is moved to mesh with the ring gear 40, synchronization of meshing becomes difficult to achieve.

Accordingly, when starting flowing of the currents I sm and I mg with a time difference, I mg is first caused to flow so as to bring the pinion 13 into engagement on the ring gear 40 and subsequently, I sm is caused to flow so as to bring the pinion 13 into meshing engagement with the ring gear 40 at the initiation period of rotation of the starter motor, thus succeeding in facilitating synchronization of meshing and attaining smooth meshing engagement.

Further, when in FIG. 9, the operation period of PWM control of starter motor 14 equals that of magnet switch 11, a status will occur in which turn-on or off of the FET 1 takes place concurrently with that of the FET 2 in their switching and as a result, two current changes overlap with each other to increase generation of noises.

Accordingly, when the operation periods of PWM control are set differently and operations of turn-on or off are carried out simultaneously, noise can be reduced by providing turn-on or off of either one of the FET's 1 and 2 with a time delay.

In the embodiment described above, when the current flowing through the battery 50 takes a rectangular waveform by the PWM control of starter motor 14 and magnet switch 11 to thereby give rise to a steep change of current with time responsible for noise generation and when worrying about malfunction of the STM 100 and generation of noises in a vehicle onboard radio, a circuit may also be structured which includes a measure for smoothing the change of current with time by connecting a capacitor between the terminal 101 of STM 100 and ground.

Then, in the previously-described embodiments, the circuit structure is such that the drain terminal D of FET 1 or FET 2 connected to the terminal 101 of STM 100 is directly connected to the battery 50 but in order to prevent currents from flowing constantly to the starter motor 14 and magnet switch 11 on account of a short-circuit fault of the FET 1 or FET 2, a circuit structure may be adopted to take a measure by which, for example, a switch is connected in a path from drain terminal D to battery 50 and the switch is opened upon detection of the short-circuit fault.

Further, in the previously-described embodiments, the PWM signals for driving the FET 1 and FET 2 (Mo-PWM and Mg-PWM) and the start signal ST from the ECU 70 are connected through the terminal 103 but putting such connection aside, serial communication or local area network may be utilized to increase the amount of reception and transmission information to control the starter motor 14 and magnet switch 11 preciously with a view to promoting the function of STM 100.

Moreover, the PWM signals for driving the FET 1 and FET 2 (Mo-PWM and Mg-PWM) may be outputted not from the ECU 70 but from the STM 100.

This enables the STM 100 to be used in common for even types of engine starting control using different types of ECU 70, starter motor 14, magnet switch 11 and meshing mechanism and therefore, standardized product groups can be assured to attain the mass-production effect.

In addition, the starter motor 14 has been explained by way of example of a DC motor subject to PWM control in which field magnetic flux is generated by permanent magnets or series field and the FET 1 is connected in series with the armature winding. But, the starter motor is not limited to the DC motor and even when an AC motor having its armature winding subject to PWM control by means of a plurality of semiconductor switches for current conduction is used, the integration of magnet switch 11 with STM 100 is possible and by performing control such that the current during the initial period of AC motor start by the Duty, advantageous effects equivalent to those set forth so far can be obtained.

In the case of an AC motor of plural phases, the connection terminal to the STM 100 has motor terminals for plural phases in addition to the single terminal 102.

The aforementioned embodiments have been described by way of the engine starting actuated when the driver operates the ignition switch but for example, in the idle stop control the adoption of which has been in progress in environment adaptive engine control in hybrid automobiles, suppressing the battery voltage VB from reducing becomes more advantageous.

More particularly, in the idle stop, the engine is stopped while waiting for a change of the traffic signal, for example, on the way of running and the engine starting is actuated upon departure. Then, it is possible to eliminate generation of such an inconvenience that when the battery voltage VB decreases below the minimum guarantee voltage VBs during engine starting, backup data must be used in, for example, navigation route, resetting of destination point, engine control unit and gear shift control unit.

INDUSTRIAL APPLICABILITY

According to the embodiments set forth so far, since the control module including the semiconductor switch is arranged integrally with the starter motor, noises do not have influence upon other control circuits through electromagnetic induction and besides, since exchangeability of attachment to the conventional engine is available, the idling stop system capable of suppressing the battery voltage from decreasing during starter motor starting period can also be applied easily to the conventional vehicles.

While the forgoing description is given to the embodiments, the present invention is not limited thereto and it is obvious to those skilled in the art that various changes and amendments can be made within the framework of the spirits of the invention and within the scope of appended claims.

REFERENCE SIGNS LIST

10 Engine starting apparatus
11 Magnet switch
12 Shift mechanism
13 Pinion
14 Starter motor
16 Open region (communication portion between magnet switch and starter motor)
20 Ring gear
50 Battery
60 IGSW
70 ECU
80 Relay
100 STM
101, 102, 103, 104 B, S, M terminals
110 Interface circuit
120, 150 FET's
130, 160 Flywheel diodes
200 Battery voltage control circuit
300 Starter motor current control circuit
310 Starter motor current sensor

The invention claimed is:

1. An engine starting apparatus comprising:
   - a pinion configured to be brought into meshing engagement with a ring gear linked to an engine;
   - a starter motor supplied with current from a battery to rotate the pinion;
   - a solenoid coil supplied with current from the battery to move the pinion in a direction of the ring gear;
   - a control module configured to control the starter motor; and
   - a first housing storing the starter motor and the solenoid coil, wherein
     - the control module comprises a first semiconductor switch configured to control current supply to the starter motor and a second semiconductor switch configured to control current supply to the solenoid coil,
     - the control module is stored in a second housing, and
     - the first housing and the second housing are connected to each other by way of a bus bar.

2. The engine starting apparatus according to claim 1, wherein
   - the first housing comprises a terminal M connecting the starter motor and the controlling module,
   - the control module comprises a first terminal connected with the battery and a second terminal connected with the starter motor, and
   - the bus bar connects the terminal M and the second terminal.

3. The engine starting apparatus according to claim 2, wherein
   - the first housing comprises a terminal B connecting the battery and the controlling module.

4. The engine starting apparatus according to claim 2, wherein
   - the controlling module comprises a third terminal connected with the solenoid coil, the first housing comprises a terminal S connecting the solenoid coil and the controlling module, and the third terminal and the terminal S are connected.

5. The engine starting apparatus according to claim 2, wherein each of a drain terminal of the first semiconductor switch and a drain terminal of the second semiconductor switch are connected with the first terminal.

6. The engine starting apparatus according to claim 2, wherein the control module comprises a capacitor connected between the first terminal and ground.

* * * * *